No. 730,949. PATENTED JUNE 16, 1903.
J. A. MILLER & C. S. WALLACE.
FLOATING FISH TRAP.
APPLICATION FILED FEB. 18, 1903.
NO MODEL. 2 SHEETS—SHEET 1.
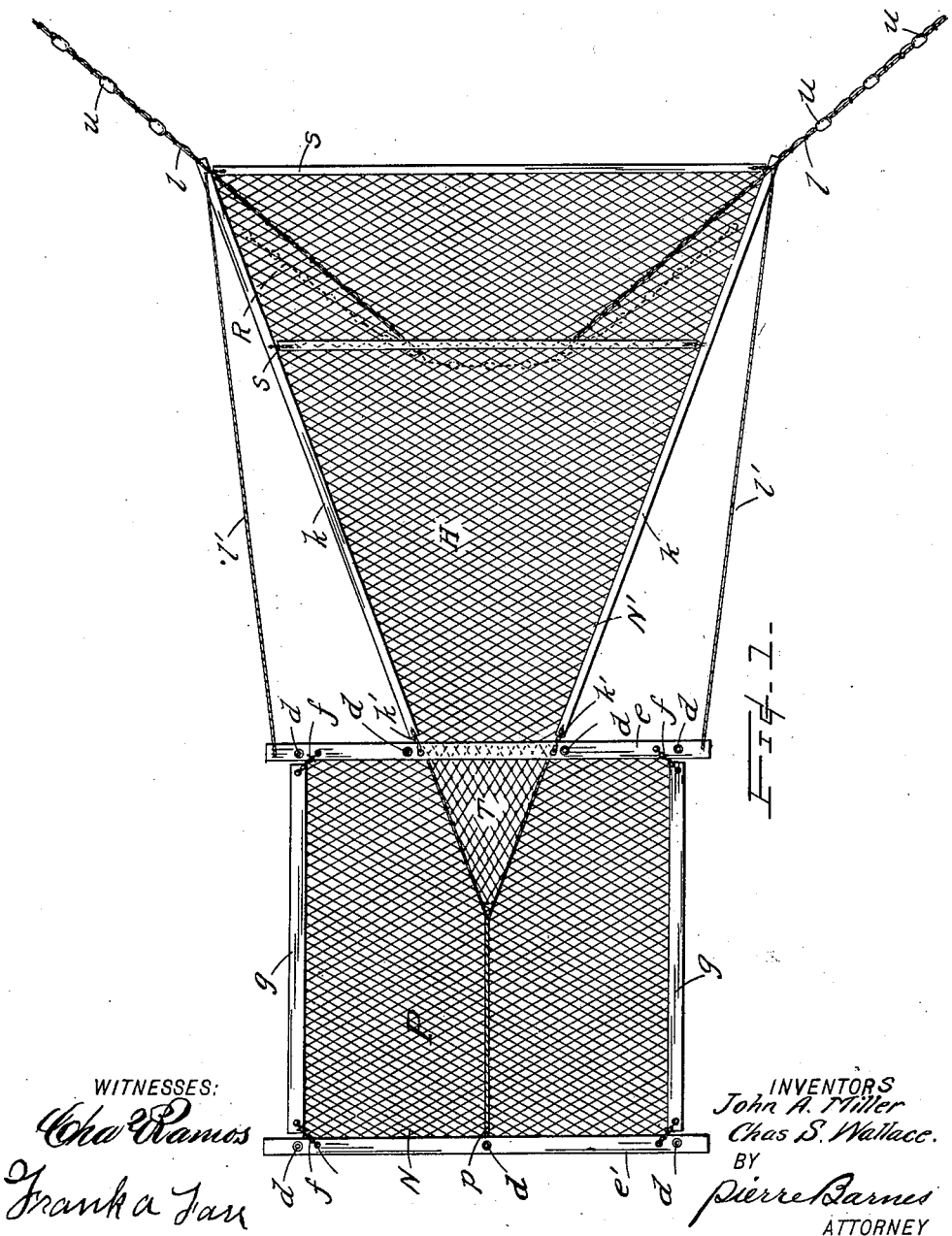
WITNESSES:
Chas Ramos
Frank A. Jay
INVENTORS
John A. Miller
Chas S. Wallace.
BY
Pierre Barnes
ATTORNEY No. 730,949. PATENTED JUNE 16, 1903.
J. A. MILLER & C. S. WALLACE.
FLOATING FISH TRAP.
APPLICATION FILED FEB. 18, 1903.
NO MODEL. 2 SHEETS—SHEET 2.
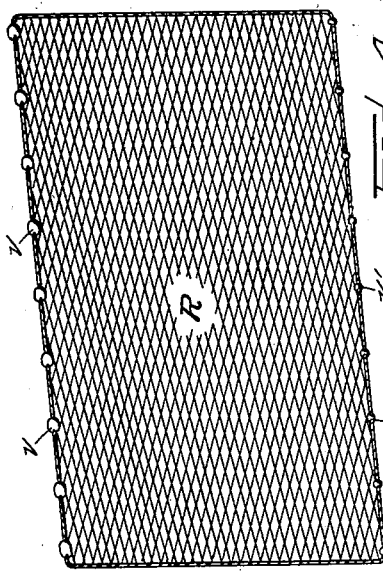
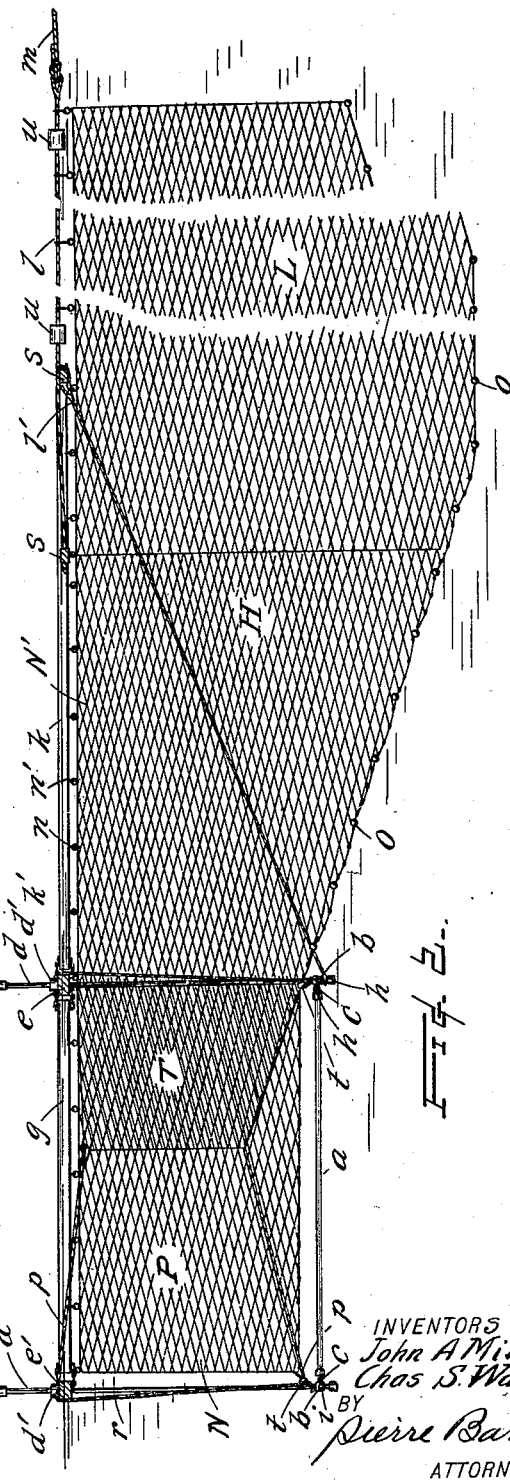
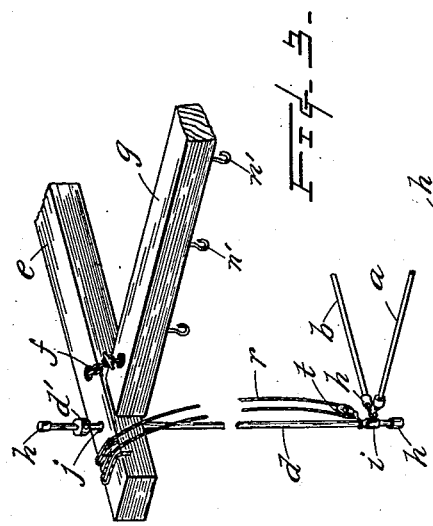
WITNESSES:
Chas Ramos
Frank A Fair
INVENTORS
John A Miller
Chas S Wallace
BY
Pierre Barnes
ATTORNEY No. 730,949. Patented June 16, 1903.

UNITED STATES PATENT OFFICE.

JOHN A. MILLER AND CHARLES S. WALLACE, OF FAIRHAVEN, WASHINGTON.

FLOATING FISH-TRAP.

SPECIFICATION forming part of Letters Patent No. 730,949, dated June 16, 1903.

Application filed February 18, 1903. Serial No. 143,961. (No model.)

*To all whom it may concern:*

Be it known that we, JOHN A. MILLER and CHARLES S. WALLACE, citizens of the United States, residing at Fairhaven, in the county of Whatcom and State of Washington, have invented certain new and useful Improvements in Floating Fish-Traps, of which the following is a specification, reference being had therein to the accompanying drawings.

This invention relates to fish-traps, and more particularly to floating fish-traps.

It is common in shallow waters to form traps of netting secured to stationary posts or piles driven into the ground and so disposed as to provide various leads and inclosures by which the fish are guided and entrapped. The disadvantages inherent to this construction are not due to faulty arrangement of the several aforementioned parts, but to the necessity of locating the traps in sheltered positions and out of the routes of navigable vessels which may or may not be in situations best suited for catching fish. Furthermore, such traps cannot be moved to take advantage of tides or currents of water or to intercept schools of fish traveling out of the radius of its action or set position. Floating traps, too, have been experimented with; but so far as our observation extends they are through poor design or by too rigid construction unfitted for general or efficient service under conditions which prevail in rough waters where such fish as salmon, herring, or smelt are found in any large quantities. With a view of overcoming the aforesaid objectionable features we have invented a flexible construction of frame for a floating trap, whereby it is enabled to remain in operation even under extremely stormy conditions of the weather or the sea. It can be towed about integrally or quickly taken apart and reassembled, according to any special requirement—as, for instance, change of location or the approach of a storm.

In the accompanying drawings, Figure 1 is a plan view, and Fig. 2 a longitudinal vertical section, of a fish-trap embodying our invention. Figs. 3 and 4 are enlarged detail perspective views of parts of the trap.

The trap comprises "leads" or guideways L, an inclosure or "heart" H, terminating in a "tunnel" T, which extends internally of an inner inclosure or "pot" P. The several said portions of the trap are formed with vertical walls of netting, and the tunnel, heart, and pot with bottoms on floors also of netting, as clearly shown in the drawings. The pot-frame consists of longitudinal members $a$, transverse members $b$, which are connected at their respective ends by chains or other flexible and removable lashings $c$ to the lower extremities of uprights $d$, depending from transversely-arranged floats $e\ e'$, preferably of timber. Positioned between the said floats and adjacent to their ends and flexibly connected thereto by removable chains $f$ or the like are longitudinal floats $g$. The first-named members $a$, $b$, and $d$ are made, preferably, of metal pipes or tubes which combine a maximum of strength with a minimum of weight. They are sealed at their several ends by caps $h$ and provided by special fittings, such as $i$, for making said connections one with the other; but under certain conditions chains instead of pipes may advantageously be used for the suspending uprights $d$. The said uprights are preferably connected to the floats by socketing in apertures $j$ of the latter, and the amount of submergence of the depending frame is adjustably regulated by means of set-collars $d'$, clamped to the uprights above the top of the floats. Secured to float $e$ by chains $k'$ or the like are wing-floats $k$, which project in diverging directions forwardly therefrom and are connected by one or more transverse spreaders $s$, which, in connection with guy-lines $l'$, prevent the distortion of this part of the frame. Extending from the advance ends of floats $k$ are lead-lines $l$, to which hawsers $m$ are bent or fastened for towing the trap or holding it in any desired position or direction by means of towing-steamers. (Not shown on the drawings.) The webbing or netting parts N N' are fastened to the several aforesaid floats by means of rings $n$, disposed along the upper edges of the netting, engaging with hooks $n'$, secured to the supporting parts. Excepting that of the pot and tunnel, weights $o$, attached at intervals along the lower edges of the nettings, provide for the downward extension or submergence of the same. The tunnel-netting is held in extended position by guy-lines $p$ and the pot-netting by lines $r$, passed through pulley-blocks $t$, secured to frame members $a$ or $b$. The lead-lines are supported by floats $u$, of cork or like buoyant bodies.

R is a rectangular-shaped apron of netting, having along its upper and lower edges, respectively, floats $v$ and weights $v'$, whereby it will assume an upright position when in the water, and is intended to be used for driving the fish from the heart H to the pot P just before removing the fish from the latter. Where the trap is positioned at the time of cleaning up with the mouth or entrance toward the current, then when the apron is lowered into the heart, as shown by broken lines in Fig. 1, it would obviously be swept by the onflow of the water toward the tunnel and drive the fish therebefore; but if the current flows in the other direction the apron would have to be dragged along by the attendants or operators.

The operation of the trap will be understood from the foregoing description; but it may be mentioned that the several nettings and frame parts may be quickly disconnected, thus permitting the trap being taken aboard the tenders or collected in compact body for towage or safety. Ordinarily, however, the trap would be moved about in its assembled condition and the pot would be emptied into the tender from time to time or when it comes filled with fish by raising the pot-netting, after which it would be drawn down into operative position by means of the blocks and tackle aforesaid.

Having described our invention, what we claim as new, and desire to secure by Letters Patent, is—

1. In a floating fish-trap, the combination with floats, of a pot-frame depending from said floats and comprised of a plurality of members, and the flexible and removable connections between the adjoining ends of the members whereby the said frame may be collapsed and collected into a compact body, substantially as and for the purposes described.

2. In combination with a floating fish-trap having a pot, a heart and leads, of a pot-frame comprising longitudinal and transverse floats, flexible connection between the contiguous ends of said floats, upright members depending from the said transverse floats, and transverse and longitudinal members flexibly secured to the lower extremities of said upright members, substantially as set forth.

3. In a floating fish-trap, in combination with a pot, a heart and lead or leads, of an apron comprising a rectangular-shaped netting having a plurality of weights attached to one edge and buoyant bodies attached to its opposite edge, substantially as and for the purpose set forth.

In testimony whereof we affix our signatures in presence of two witnesses.

JOHN A. MILLER.
CHARLES S. WALLACE.

Witnesses:
F. K. GILLETTE,
A. C. MILLER.